(No Model.)
P. M. ASKREN.
FLEXIBLE PIPE COUPLING.
No. 379,628. Patented Mar. 20, 1888.
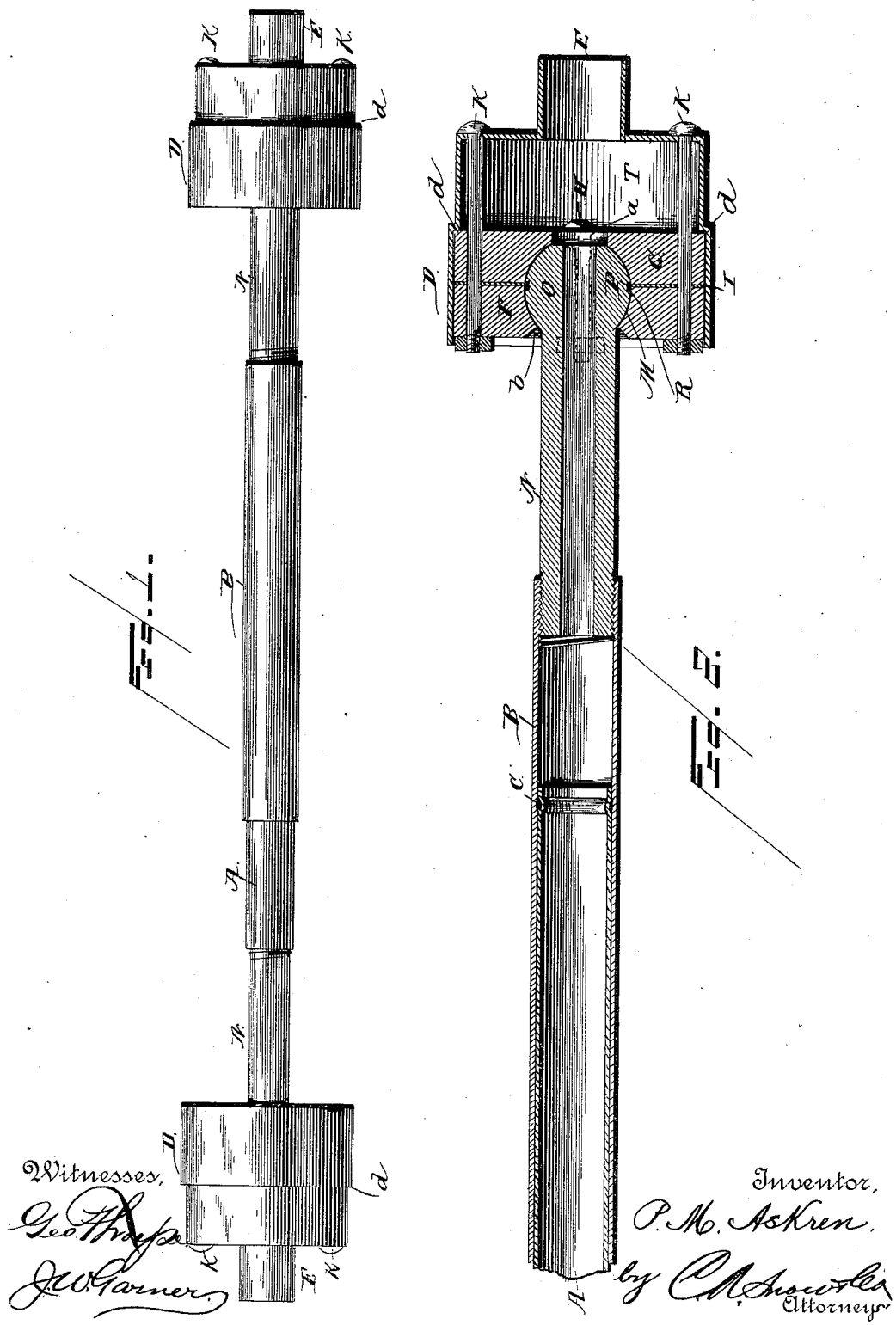

United States Patent Office.

PATTON MONROW ASKREN, OF CIRCLEVILLE, KANSAS.

FLEXIBLE PIPE-COUPLING.

SPECIFICATION forming part of Letters Patent No. 379,628, dated March 20, 1888.

Application filed October 19, 1887. Serial No. 252,832. (No model.)

*To all whom it may concern:*

Be it known that I, PATTON MONROW ASKREN, a citizen of the United States, residing at Circleville, in the county of Jackson and State of Kansas, have invented a new and useful Improvement in Flexible Pipe-Couplings, of which the following is a specification.

My invention relates to an improvement in flexible pipe-couplings adapted to enable steam to be conveyed from a locomotive through the cars of a train in order to heat the same; and it consists in the peculiar construction and combination of devices, that will be more fully set forth hereinafter, and particularly pointed out in the claim.

In the accompanying drawings, Figure 1 is an elevation of a pipe provided with flexible couplings embodying my improvements. Fig. 2 is a vertical longitudinal sectional view of the same.

A B represent a pair of pipe-sections of suitable length and diameter, which are adapted to connect one car to another. The said pipe B is of larger diameter than the pipe A, and the latter has one end fitted in the pipe B and adapted to slide in and out in the same, and is provided with a packing, C, whereby a steam-tight joint is effected between the said pipes. The pipes A and B by this means are rendered telescopic, and may be thereby lengthened and shortened, and thus adapted to the motion of the cars.

D represents a pair of cylindrical caps, one of which is designed to be attached to the end of each car. The said caps are opened on their outer sides and closed on their inner sides, as shown, and are provided at their closed ends with pipes E, which communicate with the interiors of the caps and extend through the cars, so as to heat the same. The said caps D are shouldered at D.

F G represent a pair of circular blocks or disks which are fitted in each cap D against the shoulders $d$, and are secured together by means of bolts or screws H. The said blocks are held against the shoulders of the caps, thus leaving a space or chamber, T, within the caps between the blocks F G and the pipe E. The inner side of the block G is reduced at $a$, which recess is of greater diameter than the bore of the pipe N, so that no matter in what position the latter may be turned the inner end of the bore of pipe N will still remain open.

A packing, I, of suitable material is inserted between the edges of the blocks F and G and the sides of the cap, and thereby steam-tight joints are effected between the said caps and blocks.

K represents screws or bolts which extend transversely through aligned openings in the blocks and through the inner ends of the caps D, and serve to secure the said blocks firmly in the said caps and against the shoulders $d$.

In the centers of each pair of blocks F and G and between the opposing sides of the said blocks are formed spherical openings or sockets M, and central openings, $a\ b$, are made through the outer sides of the said blocks and communicate with the said spherical sockets, as shown.

N represents a pair of pipes which are attached to the outer ends of the pipes A B, and are provided at their inner ends with spherical balls O, which fit snugly in the sockets M, and thereby form universal joints, connecting the said pipes N to the blocks F G. The spherical balls O are provided with annular grooves P, in which are secured packing-rings R, the purpose of which is to effect steam-tight joints between the balls O and the sockets M.

From the foregoing description it will be readily understood that the pipes which connect the cars are free to move laterally or vertically and to be lengthened or shortened in order to accommodate themselves to the motion of the cars.

Having thus described my invention, I claim—

The combination of the caps D, having the annular shoulders $d$, and provided with the pipes E, leading from their closed ends, the blocks F G, bolted together and secured rigidly in the caps and against the shoulders $d$, thereby leaving the unobstructed open spaces or chambers T within the caps between the blocks and the pipes E, the said blocks having the spherical sockets M and the recesses $a$ $b$, the telescoping pipes A B, the pipes N, leading from the pipes A B, and having the balls O fitting in the sockets M, and the packing-rings R around the balls O, substantially as specified.

In testimony that I claim the foregoing as my own I have hereto affixed my signature in presence of two witnesses.

PATTON MONROW ASKREN.

Witnesses:
W. A. ALLEN,
J. C. RAMY.